United States Patent
Bogen

(10) Patent No.: US 6,701,802 B2
(45) Date of Patent: Mar. 9, 2004

(54) BALANCING WEIGHT FOR A ROTATING SHAFT

(75) Inventor: William Bogen, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/021,934

(22) Filed: Dec. 13, 2001

(65) Prior Publication Data

US 2003/0110884 A1 Jun. 19, 2003

(51) Int. Cl.[7] ............................................. F16F 15/22
(52) U.S. Cl. ..................... 74/573 R; 464/180
(58) Field of Search ................ 74/573 R; 464/180

(56) References Cited

U.S. PATENT DOCUMENTS

| | | | |
|---|---|---|---|
| 2,206,472 A | | 7/1940 | Taylor ........................ 74/573 R |
| 3,688,080 A | | 8/1972 | Cartwright et al. ....... 219/137 R |
| 3,971,623 A | * | 7/1976 | Hedgewick et al. ......... 359/531 |
| 4,241,620 A | * | 12/1980 | Pichl et al. ................. 74/573 R |
| 4,425,299 A | | 1/1984 | Koiso .............................. 419/6 |
| 4,887,989 A | | 12/1989 | Kerecman ................... 464/180 |
| 4,895,551 A | | 1/1990 | Fritz ............................. 464/180 |
| 5,216,653 A | * | 6/1993 | Ohkawa ..................... 369/44.15 |
| 5,598,307 A | * | 1/1997 | Bennin ....................... 360/245.9 |
| 5,722,896 A | | 3/1998 | Beagley et al. ............. 464/180 |
| 5,778,737 A | | 7/1998 | Welsh et al. ................ 74/573 R |
| 6,032,551 A | | 3/2000 | Welsh et al. ................ 74/573 R |
| 6,334,568 B1 | * | 1/2002 | Seeds ......................... 228/114.5 |
| 6,501,171 B2 | * | 12/2002 | Farquhar et al. ............ 257/706 |

FOREIGN PATENT DOCUMENTS

| | | | | |
|---|---|---|---|---|
| DE | 3913493 C1 | * | 1/1990 | .............. C09J/5/00 |
| GB | 2041159 | | 9/1980 | |
| GB | 31 40 368 A1 | | 1/1983 | |
| GB | 2119063 | | 11/1983 | |

* cited by examiner

*Primary Examiner*—David Fenstermacher
(74) *Attorney, Agent, or Firm*—Brinks Hofer Gilson & Lione

(57) ABSTRACT

A method of attaching a balance weight to a rotating shaft includes providing a balancing weight which is adapted to be attached to the rotating shaft, wherein the balancing weight comprises a plate with an inner surface and an outer surface, and the plate is curved such that the inner surface has a profile which matches the outer surface of the rotating shaft and the plate includes a plurality of orifices extending through the plate, each of the orifices having an inner wall defining a support surface. An adhesive is applied to the rotating shaft, and the balancing weight is placed onto the rotating shaft with the adhesive located between the balancing weight and the rotating shaft. The adhesive is then cured to form a secure attachment of the balancing weight to the rotating shaft.

16 Claims, 2 Drawing Sheets

BALANCING WEIGHT FOR A ROTATING SHAFT

TECHNICAL FIELD OF THE INVENTION

The present invention generally relates to a balancing weight used to balance a rotating shaft and a method of applying the balancing weight to a shaft.

BACKGROUND

Typically, steel or aluminum balance weights for drive shafts are welded onto skirts on weld yokes at the end of the drive shaft. The heat of the welding process can cause the drive shaft to distort, thereby causing the drive shaft to require re-balancing after cooling. The ends of the drive shaft are not the optimal locations to place the balancing weights, however welding the balancing weights to the thin walled portions of the drive shaft is more difficult than welding the balancing weights to the skirts at the ends of the drive shaft. Using an adhesive to attach the balancing weights to the drive shaft would eliminate the distortion due to welding, reduce the cost of the weights and eliminate the skirts on the weld yokes, thereby lowering the weight of the drive shaft. Unfortunately, the curing time for most suitable adhesives is too long for normal production cycle times. Some adhesives can be cured much faster by exposing the adhesive to ultra-violet light. These adhesives can cure in as little as ten seconds, however only the adhesive that is directly exposed to the ultra-violet light cures, thereby only providing a secure bond around the edges of the weight where the adhesive oozes out from under the weight. The remaining adhesive under the main body of the weight, which is not exposed to the ultra-violet light can take up to 24 hours to cure properly, even with a chemical activator. Therefore, there is a need for an improved balancing weight and method of attaching the balancing weight to a rotating cylindrical shaft.

DETAILED DESCRIPTION OF THE PREFERRED EMBODIMENTS

The following description of the preferred embodiments of the invention is not intended to limit the scope of the invention to these preferred embodiments, but rather to enable any person skilled in the art to make and use the invention.

Figure 1:
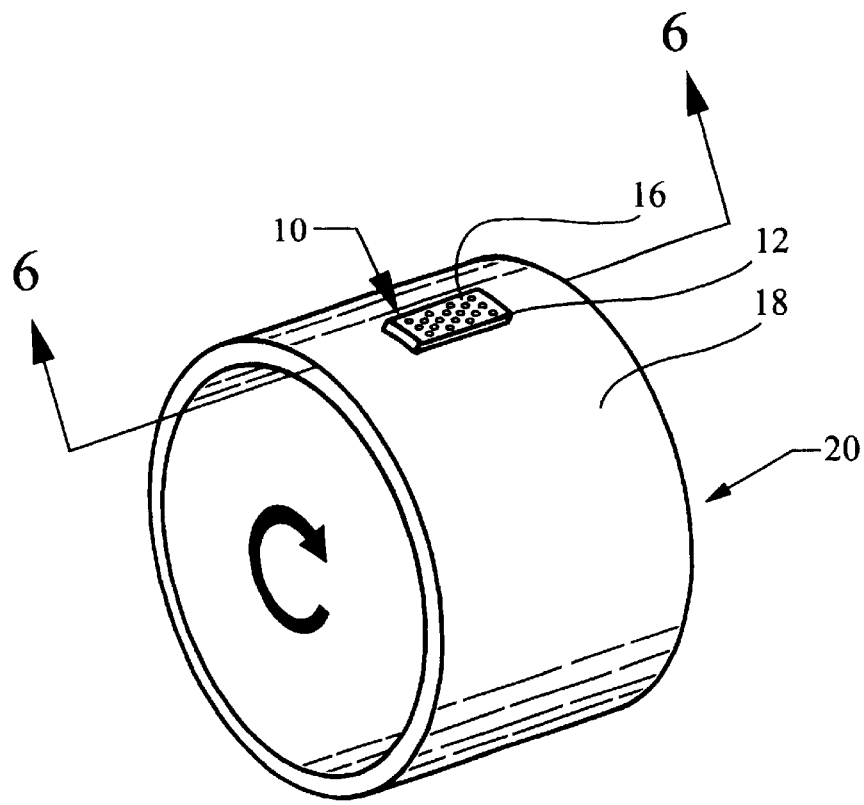
FIG. 1 is a perspective view of a section of a rotating shaft with a balancing weight of the preferred embodiment mounted thereon.

Referring to Figures, a balancing weight for a rotating shaft is shown generally at 10. The balancing weight 10 is a plate 12 with an inner surface 14 and an outer surface 16. Preferably, the plate 12 is generally rectangular, however any other shape could also be appropriate. Referring to FIG. 1, the plate 12 is shaped such that the inner surface 14 has a profile which matches an outer surface 18 of the rotating shaft 20. The curved shape allows the balancing weight 10 to have maximum surface area contact with the surface 18 of the rotating shaft 20.

Referring to FIGS. 2 through 5, the plate 12 includes a plurality of orifices 22 extending through the plate 12. Each of the orifices 22 has an inner wall 24 which defines a support surface 26. Preferably, the orifices 22 have a major diameter 25 of approximately 0.125 inches and are spaced from one another across the plate 12 at a distance of 0.25 inches from each other.

Figure 3:
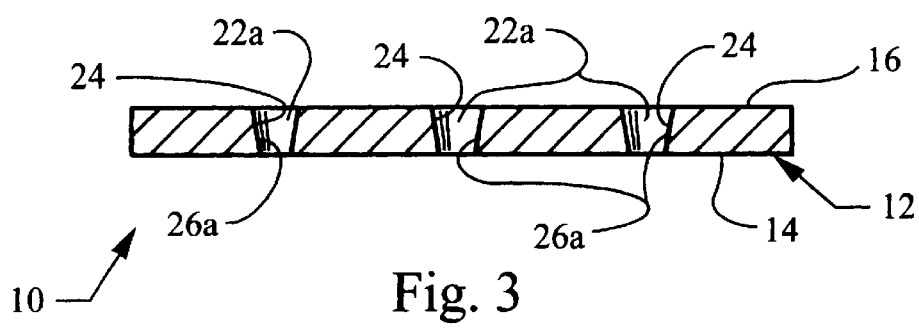
FIG. 3 is a side sectional view taken along line A—A of FIG. 2 with orifices of a first preferred embodiment.
Figure 4:
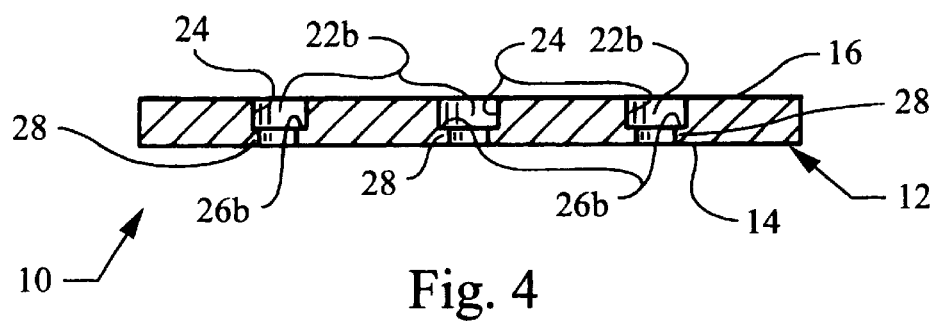
FIG. 4 is a side sectional view taken along line A—A of FIG. 2 with orifices of a second preferred embodiment.
Figure 5:
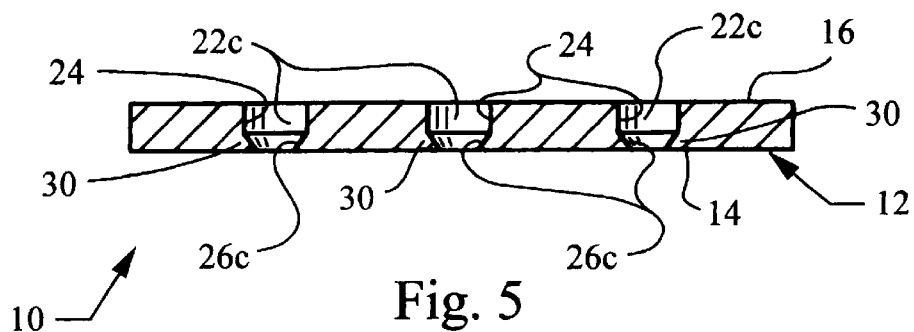
FIG. 5 is a side sectional view taken along line A—A of FIG. 2 with orifices of a third preferred embodiment.

Referring to FIG. 3, in a first embodiment, orifices 22a extending through the plate 12 are conical in shape with a narrow end directed toward said inner surface 14. The angled sides of the conical orifices 22a define a support surface 26a. Referring to FIG. 4, in a second embodiment, orifices 22b extend through the plate 12 and include a step 28 which defines a support surface 26b. Referring to FIG. 5, in a third embodiment, orifices 22c extending through the plate 12 include an angled inwardly extending lip 30 adjacent the inner surface 14. An upper surface of the inwardly extending lip 30 defines a support surface 26c.

Preferably, the balancing weight 10 is made from a metallic material such as aluminum or steel. However, it is to be understood that the balancing weight 10 could be made out of any material which has sufficient mass to perform the balancing function for the rotating shaft 20, as well as being strong enough to withstand the forces which will be exerted upon the balancing weight 10 when the rotating shaft 20 is spinning at full speed.

To attach the balancing weight 10 to the rotating shaft 20, an adhesive 32 is placed onto the rotating shaft 20 at the point where the balancing weight 10 is to be mounted. The adhesive 32 is of a type which will cure very quickly when exposed to ultra-violet light. In order to be practical for mass production, the balancing weight 10 must be able to be mounted securely to the rotating shaft 20 within production cycle times. Preferably, the adhesive 32 is of the type that will substantially cure within about 10 seconds upon exposure to ultra-violet light.

Figure 6:
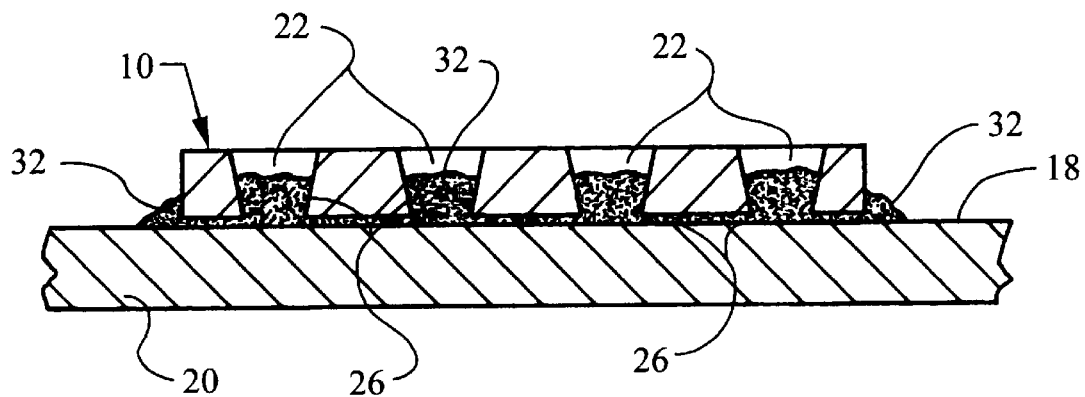
FIG. 6 is a side sectional view taken along line 6—6 of FIG. 1.
Figure 2:
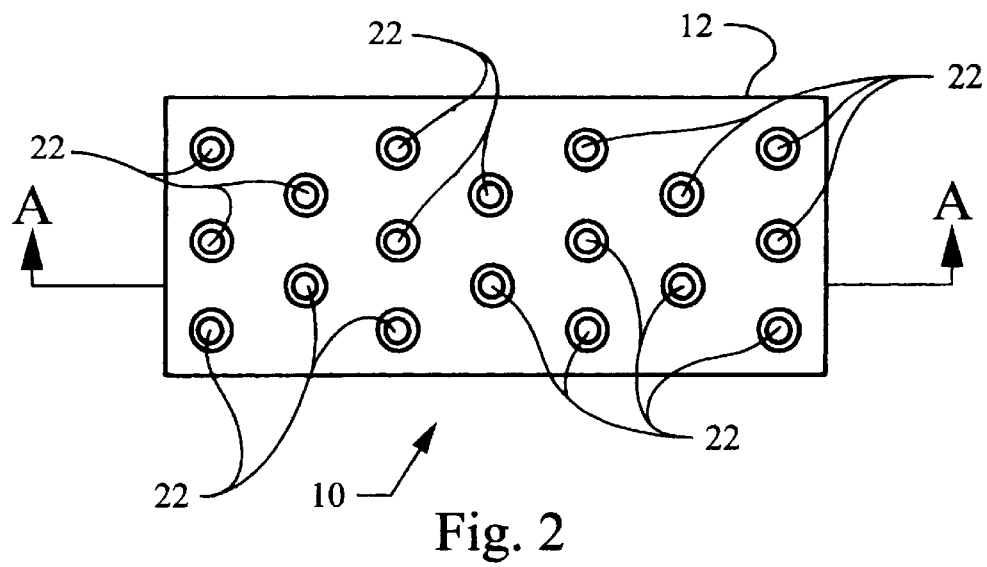
FIG. 2 is a top view of the balancing weight.

After applying the adhesive 32 to the rotating shaft 20, the balance weight 10 is placed onto the rotating shaft 20. Referring to FIG. 6, the balancing weight 10 is pressed into the adhesive 32 such that the adhesive 32 is forced outward around the edges of the balancing weight 10 and upward within the orifices 22 in the balancing weight 10. The balancing weight 10 is pressed with enough force to cause the adhesive 32 to well up within the orifices 22 above the support surface 26.

Once the balancing weight is pressed into the adhesive 32, then the adhesive 32 is cured. The rotating shaft 20 with the balancing weight 10 mounted thereon is placed within an ultra-violet light. The ultra-violet light will rapidly cure those portions of the adhesive 32 which come into direct contact with the ultra-violet light. Specifically, the ultra-violet light will hit the adhesive 32 that is forced outward around the edges of the balancing weight 10. The ultra-violet light will also travel within the orifices 22 and directly contact the adhesive 32 forced up within the orifices 22.

The ultra-violet light will rapidly cure those portions of the adhesive 32 around the edges of the balancing weight 10 and within the orifices 22 to provide a substantially secure attachment to the rotating shaft 20. Once the adhesive 32 within the orifices 22 cures, the cured adhesive 32 will provide a stop against the support surfaces 26 of the orifices 22 to prevent the balancing weight from lifting off the surface 18 of the rotating shaft 20.

The foregoing discussion discloses and describes three preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

I claim:

1. A method of attaching a balance weight to a rotating shaft including;
   providing a balancing weight which is adapted to be attached to the rotating shaft, wherein the balancing weight comprises a plate with an inner surface and an outer surface, and the plate includes a plurality of orifices extending through the plate, each of said orifices having an inner wall defining a support surface;
   providing an adhesive adapted to secure the balancing weight onto said rotating shaft;
   applying the adhesive to the rotating shaft;
   placing the balancing weight onto the rotating shaft with the adhesive located between the balancing weight and the rotating shaft and pressing the balancing weight into the adhesive until the adhesive is forced out around the edges of the balance weight and up into the orifices, whereby the adhesive fills the orifices to a point above the support surfaces; and
   curing the adhesive to form a secure attachment of the balancing weight to the rotating shaft.

2. The method of claim 1 wherein the orifices within the balancing weight include an inwardly angled extending lip adjacent the inner surface, an upper surface of the inwardly extending lip defining the support surface.

3. The method of claim 1 wherein the adhesive is an adhesive which is adapted to cure rapidly when exposed to ultra-violet light and curing the adhesive includes exposing the adhesive which is forced out around the edges of the balancing weight and the adhesive within the orifices to ultra-violet light until the adhesive around the edges of the balancing weight and the adhesive within the orifices cures sufficiently to secure the balancing weight to the rotating shaft.

4. The method of claim 1 wherein the orifices within the balancing weight are conical in shape with a narrow end directed toward the inner surface, whereby the angle sides of the conical orifice define the support surface.

5. The method of claim 1 wherein the orifices within the balancing weight includes a step defining the support surface.

6. The method of claim 1 wherein the balancing weight is made from metal.

7. The method of claim 6 wherein the balancing weight is made from steel.

8. The method of claim 6 wherein the balancing weight is made from aluminum.

9. A rotatable shaft comprising;
   a rotatable shaft;
   a balancing weight mounted onto said rotatable shaft, said balancing weight comprising a plate with an inner surface, an outer surface, and a plurality of orifices extending through the plate, each of said orifices having an inner wall defining a support surface; and
   an adhesive disposed between said rotatable shaft and said balancing weight, thereby forming an adhesive bond between said rotatable shaft and said balancing weight, said adhesive extending outward around said balancing weight and upward into said orifices to a point above said support surfaces to form a mechanical bond between said balancing weight and said rotatable shaft.

10. The rotatable shaft of claim 9 wherein said adhesive is adapted to cure rapidly when exposed to ultra-violet light.

11. The rotatable shaft of claim 9 wherein said orifices are conical in shape with a narrow end directed toward said inner surface, whereby the angled sides of said conical shaped orifices define said support surfaces of said orifices.

12. The rotatable shaft of claim 9 wherein said orifices within the balancing weight include a step defining said support surface.

13. The rotatable shaft of claim 9 wherein said orifices within the balancing weight include an inwardly angled extending lip adjacent the inner surface, an upper surface of said inwardly extending lip defining said support surface.

14. The rotatable shaft of claim 9 wherein said balancing weight is made from metal.

15. The rotatable shaft of claim 14 wherein said balancing weight is made from aluminum.

16. The rotatable shaft of claim 14 wherein said balancing weight is made from steel.

* * * * *